UNITED STATES PATENT OFFICE.

SILAS C. MATTESON, OF CAMPBELLSPORT, WISCONSIN.

COMPOSITION FOR PRESERVING EGGS.

SPECIFICATION forming part of Letters Patent No. 432,060, dated July 15, 1890.

Application filed August 24, 1889. Serial No. 321,896. (Specimens.)

*To all whom it may concern:*

Be it known that I, SILAS C. MATTESON, a citizen of the United States, residing at Campbellsport, in the county of Fond du Lac and State of Wisconsin, have invented a new and useful Preserving Compound for Eggs, of which the following is a specification.

This invention has relation to a compound for the preservation of eggs against spoiling in warm weather and freezing in cold weather; and the invention consists in a powder, in which the eggs are packed in any ordinary manner, said powder being composed of the following ingredients, combined in substantially the proportions given: silica, seventy-five parts; alumina, (the earthy oxide of the metal aluminum,) ten parts; peat-ash and clay, evenly mixed, fifteen parts.

The above ingredients are ground, mixed, and molded into brick form and burned in an ordinary kiln, after which they are reduced to a fine powder. The powder thus formed is both exceedingly dry and cold, and by experience I have found that eggs may be thoroughly preserved for from eight to ten months in climates where the temperature does not exceed sixty-five degrees.

The peat materially aids in a thorough burning of the compound.

Having described my invention, what I claim is—

The herein-described egg-preserving compound in powdered form, consisting of silica, alumina, peat-ash, and clay ground and mixed together in substantially the proportions specified.

In testimony that I claim the foregoing as my own I have hereto affixed my signature in presence of two witnesses.

SILAS C. MATTESON.

Witnesses:
 ETTA MATTESON,
 ELLA MATTESON.